United States Patent
Clapp et al.

(10) Patent No.: US 10,240,643 B2
(45) Date of Patent: Mar. 26, 2019

(54) SELF-CONTAINED CLUTCH FOR DIESEL ENGINES

(71) Applicant: PT TECH, LLC, Sharon Center, OH (US)

(72) Inventors: Timothy A. Clapp, Queen Creek, AZ (US); Richard E. Cole, LaGrange, OH (US); David A. Farwell, Atwater, OH (US); Tyler A. Naumoff, Powell, OH (US); David J. Morris, Novelty, OH (US)

(73) Assignee: PT TECH, LLC, Sharon Center ( * ) Notice: Subject to any disclaimer, the term of this patent is extended or adjusted under 35 U.S.C. 154(b) by 123 days.

(21) Appl. No.: 15/534,543

(22) PCT Filed: Dec. 10, 2015

(86) PCT No.: PCT/US2015/064944
§ 371 (c)(1),
(2) Date: Jun. 9, 2017

(87) PCT Pub. No.: WO2016/094631
PCT Pub. Date: Jun. 16, 2016

(65) Prior Publication Data
US 2017/0363156 A1 Dec. 21, 2017

Related U.S. Application Data

(60) Provisional application No. 62/090,522, filed on Dec. 11, 2014.

(51) Int. Cl.
*F16D 13/38* (2006.01)
*F16D 67/02* (2006.01)
(Continued)

(52) U.S. Cl.
CPC .............. *F16D 13/38* (2013.01); *F16D 13/70* (2013.01); *F16D 13/74* (2013.01);
(Continued)

(58) Field of Classification Search
None
See application file for complete search history.

(56) References Cited

U.S. PATENT DOCUMENTS

| 2,710,078 A | 6/1955 | Cardwell |
| 3,680,670 A | 8/1972 | Hansen |

(Continued)

FOREIGN PATENT DOCUMENTS

WO WO 2007/101686 9/2007

OTHER PUBLICATIONS

International Search Report and Written Opinion (EP Application No. 15 866 8392); pp. 1-11, European Patent Office.

*Primary Examiner* — Timothy Hannon
(74) *Attorney, Agent, or Firm* — Renner Kenner Greive Bobak Taylor & Weber

(57) ABSTRACT

A self-contained clutch for diesel engines for off-highway implementation is provided. A stationary friction disc, pressure plate and endplate sandwich a pair of rotating separator discs. Attenuation of vibration damping of the rotator discs may be achieved by a centrifugal weight. A pulse-width-modulated DC motor or valve is employed in association with a hydraulic actuator to control pressure to the clutch piston. An RFID tag uniquely identifies the nature and parameters of the clutch itself and is associated with the clutch such that the controller can most efficiently operate the clutch. Heat is dissipated by an oil pump servicing the support bearings and/or by the integration of a centrifugal fan into the heat disc stack.

19 Claims, 15 Drawing Sheets

(51) Int. Cl.
- *F16D 25/0638* (2006.01)
- *F16D 13/70* (2006.01)
- *F16D 13/74* (2006.01)
- *F16D 25/0635* (2006.01)
- *F16D 48/06* (2006.01)

(52) U.S. Cl.
CPC ..... *F16D 25/0635* (2013.01); *F16D 25/0638* (2013.01); *F16D 48/06* (2013.01); *F16D 67/02* (2013.01); *F16D 2300/0212* (2013.01); *F16D 2300/18* (2013.01); *F16D 2300/22* (2013.01)

(56) References Cited

U.S. PATENT DOCUMENTS

| | | |
|---|---|---|
| 3,912,060 A | 10/1975 | Handke |
| 4,589,533 A | 5/1986 | Del Duca |
| 7,007,782 B2 | 3/2006 | Anwar et al. |
| 7,692,543 B2 | 4/2010 | Copeland et al. |
| 2001/0025759 A1 | 10/2001 | Sarar |
| 2008/0146396 A1 | 6/2008 | Millar |
| 2008/0214355 A1 | 9/2008 | Capito et al. |
| 2012/0024655 A1 | 2/2012 | Clapp |
| 2013/0048461 A1 | 2/2013 | Pardee et al. |
| 2014/0266754 A1* | 9/2014 | Hennessy .............. G08B 23/00 340/679 |

* cited by examiner

SELF-CONTAINED CLUTCH FOR DIESEL ENGINES

CROSS-REFERENCE TO RELATED APPLICATIONS

The instant application claims the benefit of U.S. Provisional Patent Application Ser. No. 62/090,522, filed on Dec. 11, 2014, incorporated herein.

TECHNICAL FIELD

The invention herein resides in the art of power transmission devices and, more particularly, to clutch assemblies. Specifically, the invention relates to a self-contained clutch adapted for employment with diesel engines as typically used in association with off-highway, diesel-driven equipment.

BACKGROUND OF THE INVENTION

As the market for mobile, off-highway, diesel-driven equipment has matured, the need for engine clutches that are compact yet sophisticated and reliable in operation continues to expand. As interest in such clutches increases, the desirability of clutch products that are easy to integrate into existing machine designs has increased as well. It is most desired that the retrofitting of compact, sophisticated, reliable clutches to existing off-highway diesel engines be easy to effect and with minimal downtime and expense involved.

For nearly a century now, the clutches used for mobile, off-highway, diesel-driven equipment have employed the same friction disc pack geometry. While reliable, such designs have demonstrated limitations including friction plate thickness, thermal capacity, and the inability to be readily rebuilt or refurbished. Moreover, as demands have been made on the sophistication and capabilities of such clutches, it has become desirable to provide a clutch assembly that is compact in design, providing space to accommodate features and capabilities that were previously unavailable.

DISCLOSURE OF INVENTION

In light of the foregoing, it is a first aspect of the invention to provide a self-contained clutch for diesel engines that employs separator rotors and frictional stators in contradistinction to the teachings of the prior art.

It is another aspect of the invention to provide a self-contained clutch for diesel engines having improved friction plate thickness, heat capacity and refurbishing capability over similar clutches of the prior art.

Still a further aspect of the invention is the provision of a self-contained clutch for diesel engines wherein the separator plate rotors are provided with means for damping of vibrations.

Still another aspect of the invention is the provision of a self-contained clutch for diesel engines having a self-contained, electric-over-hydraulic actuator and control assembly operating with a pulse-width-modulated motor or valve.

Yet a further aspect of the invention is the provision of a self-contained clutch for diesel engines wherein an RFID tag or chip in close proximity to the actuator controller identifies characteristics of the clutch such that the controller can tailor operation accordingly.

Still a further aspect of the invention is the provision of a self-contained clutch for diesel engines containing a lubrication pump for the support bearings.

An additional aspect of the invention is the provision of a self-contained clutch for diesel engines including a centrifugal fan within the friction pack to assist in heat dissipation.

The foregoing and other aspects of the invention are attained by a self-contained diesel engine clutch assembly, comprising a shaft; an endplate and a pressure plate received on an end of said shaft and rotatable therewith; a friction stator; first and second separator rotors between said endplate and pressure plate and sandwiching said stator; and a plurality of drive pins passing through outer circumferential areas of said first and second rotors adapted for engagement with an SAE flywheel bolt pattern.

Further aspects of the invention are attained by a self-contained diesel engine clutch assembly, comprising a shaft; an endplate and a pressure plate received on an end of said shaft and rotatable therewith; a friction stator connected to said endplate; first and second separator rotors between said endplate and pressure plate and sandwiching said stator, said rotors having means for damping vibration; a plurality of drive pins passing through outer circumferential areas of said first and second rotors for attachment to a flywheel; a housing maintaining said shaft, endplate, pressure plate, stator and rotors, and an oil pump lubricating support bearings of said shaft; and an electric motor connected to a hydraulic pump assembly, said electric motor being controlled by pulse width modulation to regulate an application of hydraulic pressure to said pressure plate.

BRIEF DESCRIPTION OF THE DRAWINGS

For a complete understanding of the various aspects of the invention, reference should be made to the following detailed description and accompanying drawings wherein.

DETAILED DESCRIPTION OF PREFERRED EMBODIMENT

Figure 1:
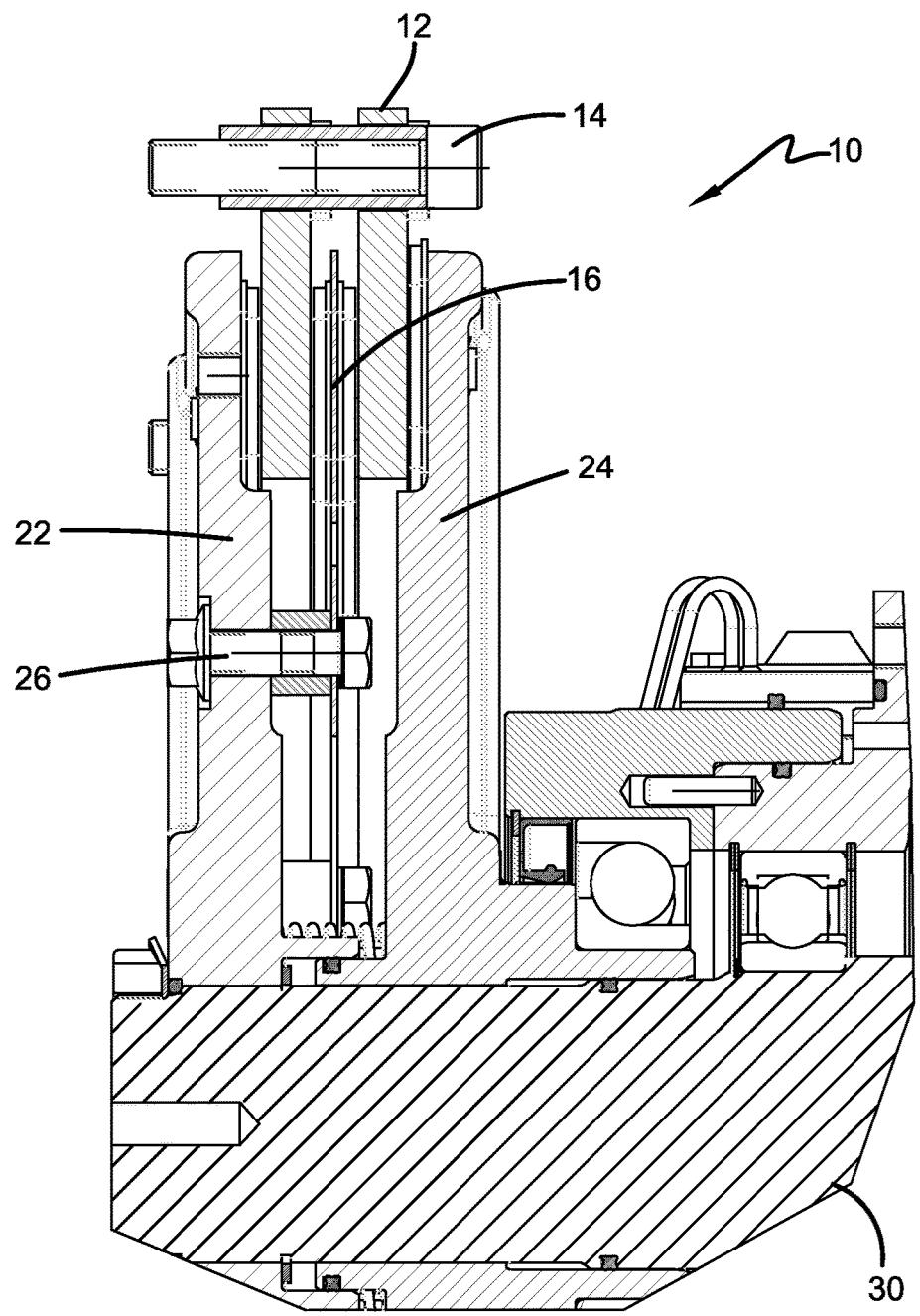
FIG. 1 is a sectional view of the disc stack of the invention.
Figure 3:
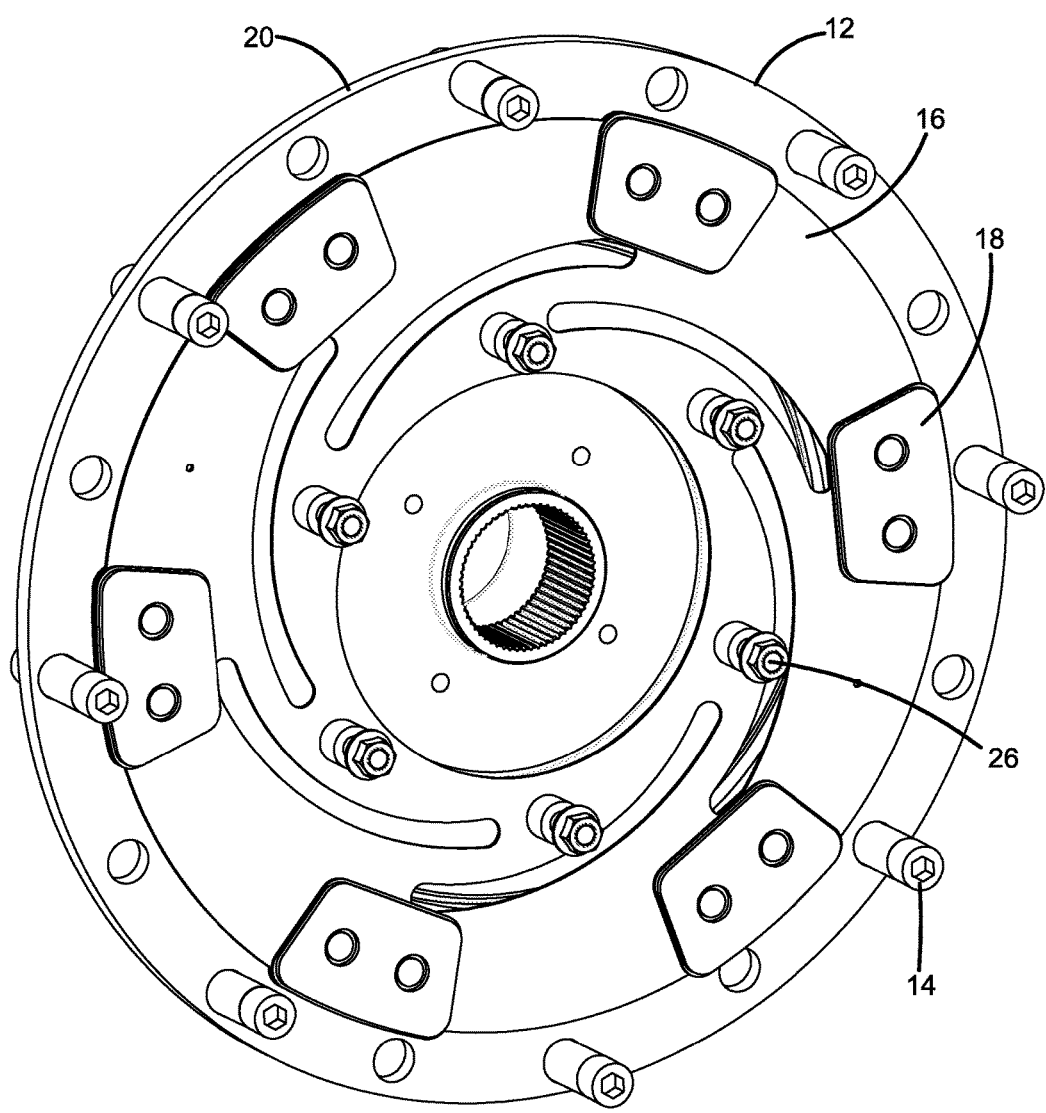
FIG. 3 is an elevational view of the flex plate stator of the invention in association with a separator disc.

Referring now to the drawings, and more particularly FIG. 1, it can be seen that a portion of a diesel engine clutch assembly according to the invention is designated generally by the numeral 10. A pair of separator rotors 12 is adapted for connection to a flywheel or the like (not shown) by means of drive bushings 14 and associated bolts. Sandwiched between the separator rotors 12 is a flex plate stator 16 having friction material thereon such as friction pads 18, as best shown in FIG. 3. The flex plate 16 is characterized by helical or arcuate slots 20 to provide the spring or flex nature of the stator 16.

The stator and rotors are maintained between an endplate 22 and pressure plate 24, each of which may be provided with friction material or friction pads thereon. As shown, a suitable bolt 26 or the like secures the stator 16 to the endplate 22.

While in the prior art the rotating elements were the friction-bearing plates, according to the instant invention, the friction-bearing members are stators while the separator discs are the rotors. This is achieved by attaching the drive pins or bushings 14 to the engine's standard SAE bolt-pattern flywheel by bolts or appropriate studs. In turn, the separator plates 12, which have corresponding holes or straight-sided splines, allow for thermal expansion. The separators 12 are engaged with the clutch output shaft 30 through an appropriate internal spline, which preferably features a permanently greased connection. Additionally, the center friction plate or flex plate 16 employs an integrated leaf spring design as a consequence of the slots 20, causing the stator 16 to be compliant and providing extra release spring force.

It will be appreciated that while the design presented is shown to be engaged by means of a stationary hydraulic piston and thrust bearing, it is also contemplated that such application and release can be achieved through a rotary union, electromagnetically, or by spring force.

Figure 2:
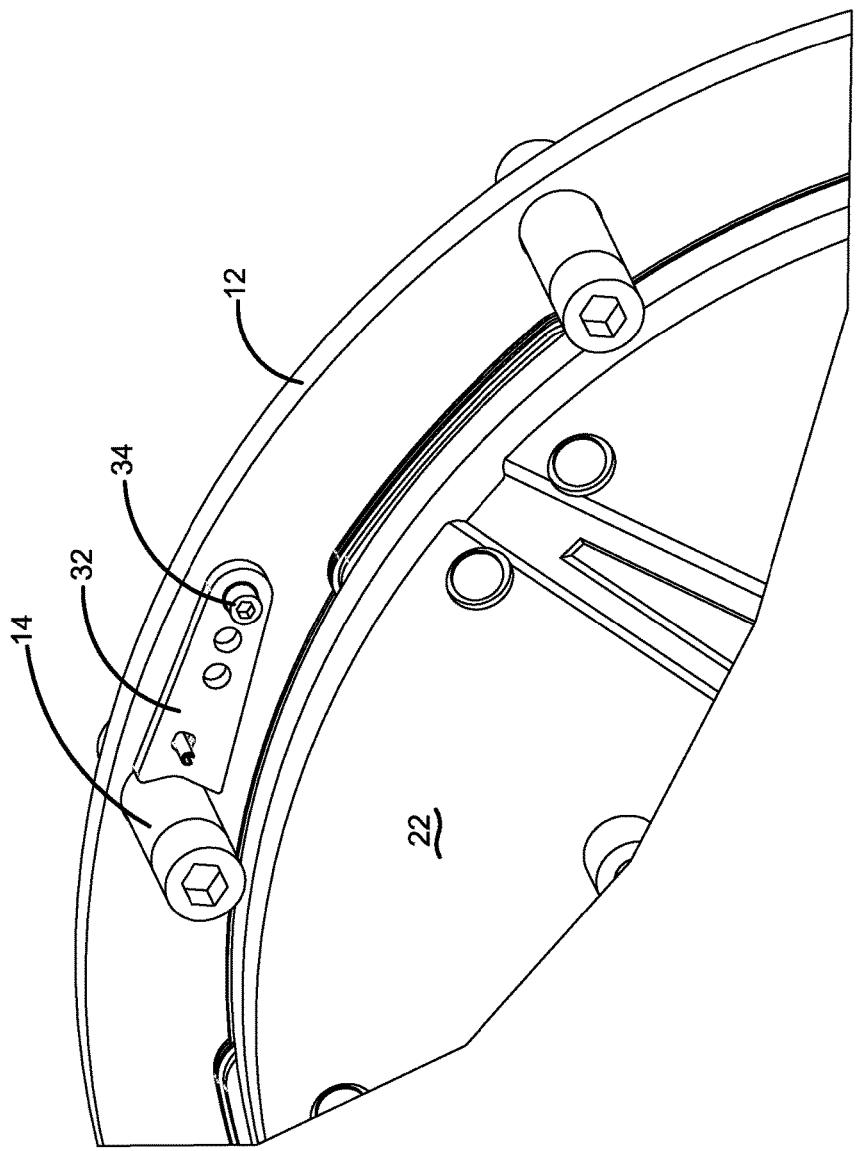
FIG. 2 is an illustration of a damping mechanism used in association with the separator discs of the invention.
Figure 4:
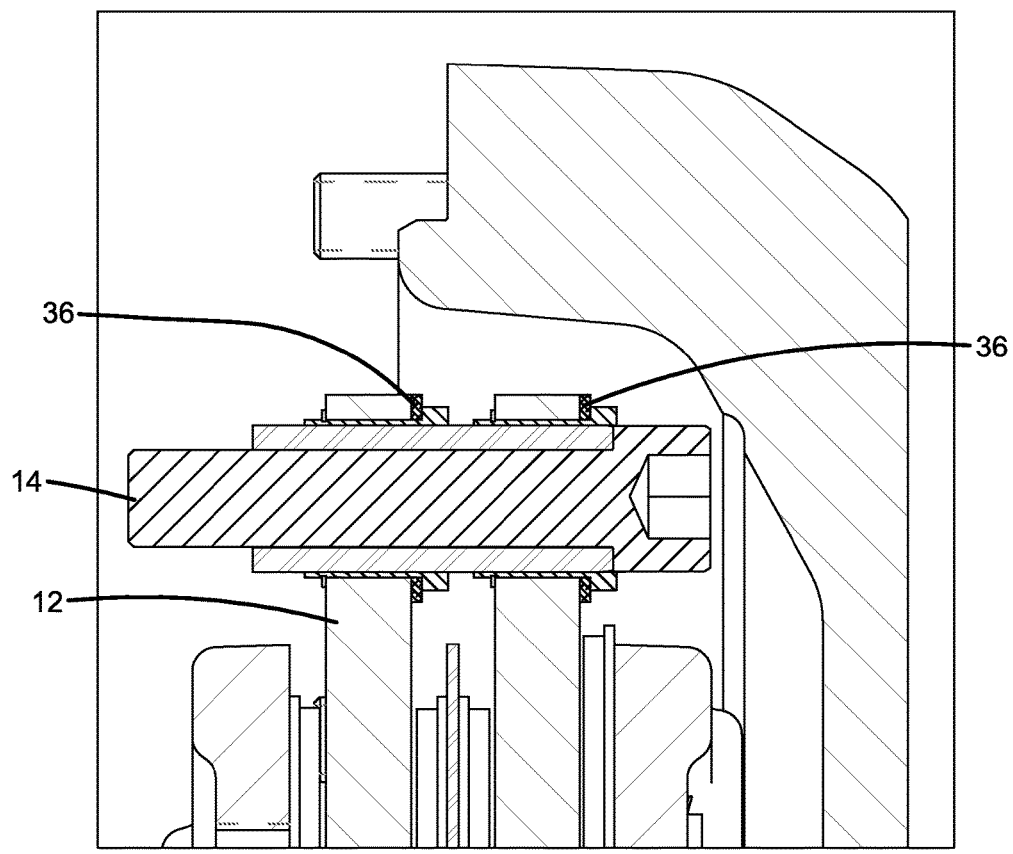
FIG. 4 is a sectional view showing the implementation of friction washers to accommodate vibration attenuation.

Another aspect of the invention is the provision of vibration damping, which primarily occurs when the clutch is disengaged while being coupled to torsionally active prime movers. With reference to FIG. 2, a first approach to counteract this phenomenon is shown. There, a centrifugal counterweight 32 is attached to the separator plate 12 to apply a radial force on the drive bushing 14. The weight 32 is pivotally mounted as by means of a pivot pin 34. As shown in FIG. 4, an alternative approach to such vibration damping employs friction washers 36 that are coaxial to the drive bushing 14, and which interact with the separator plate 12. Yet further, it is contemplated that an elastomeric polymer may be bonded to the bushing to absorb the torsional energy.

Figure 5:
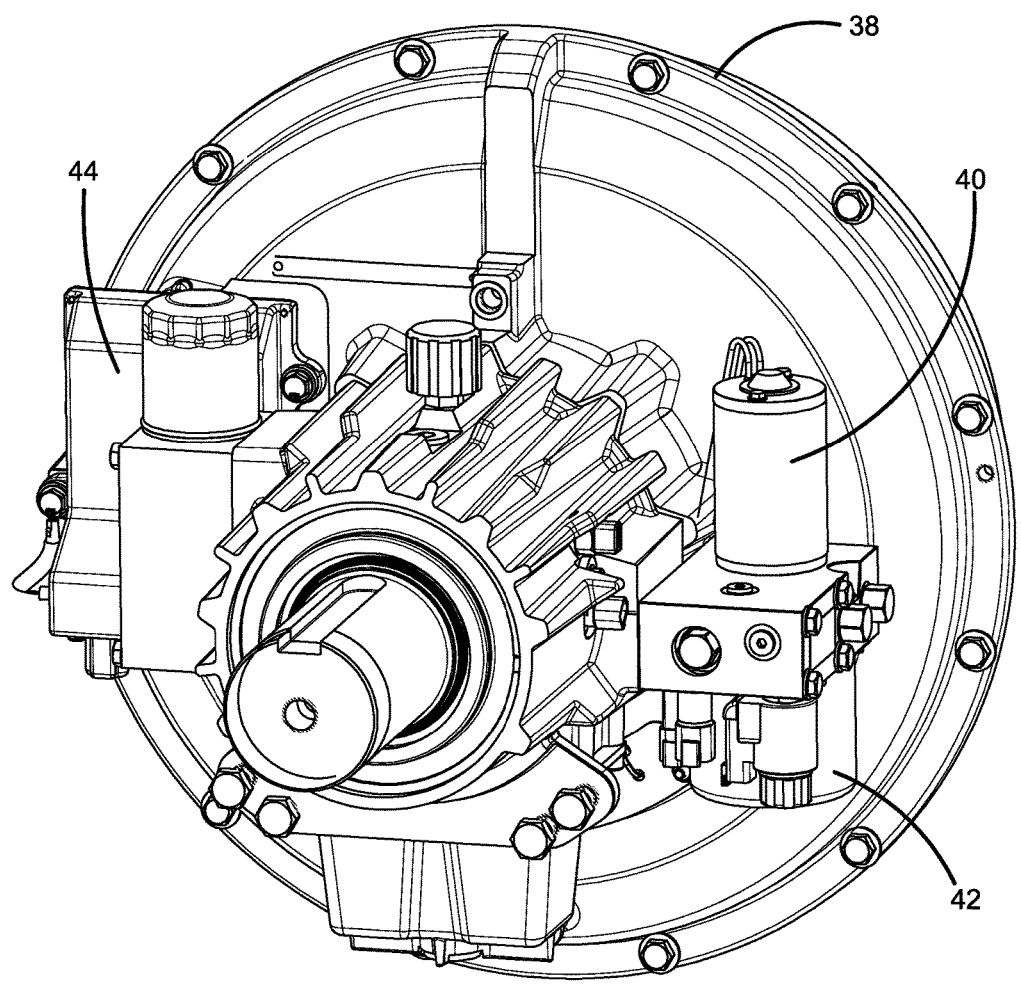
FIG. 5 is an illustrative view of the clutch assembly of the invention showing the presence of the motor, hydraulic pump and controller of the invention.
Figure 7:
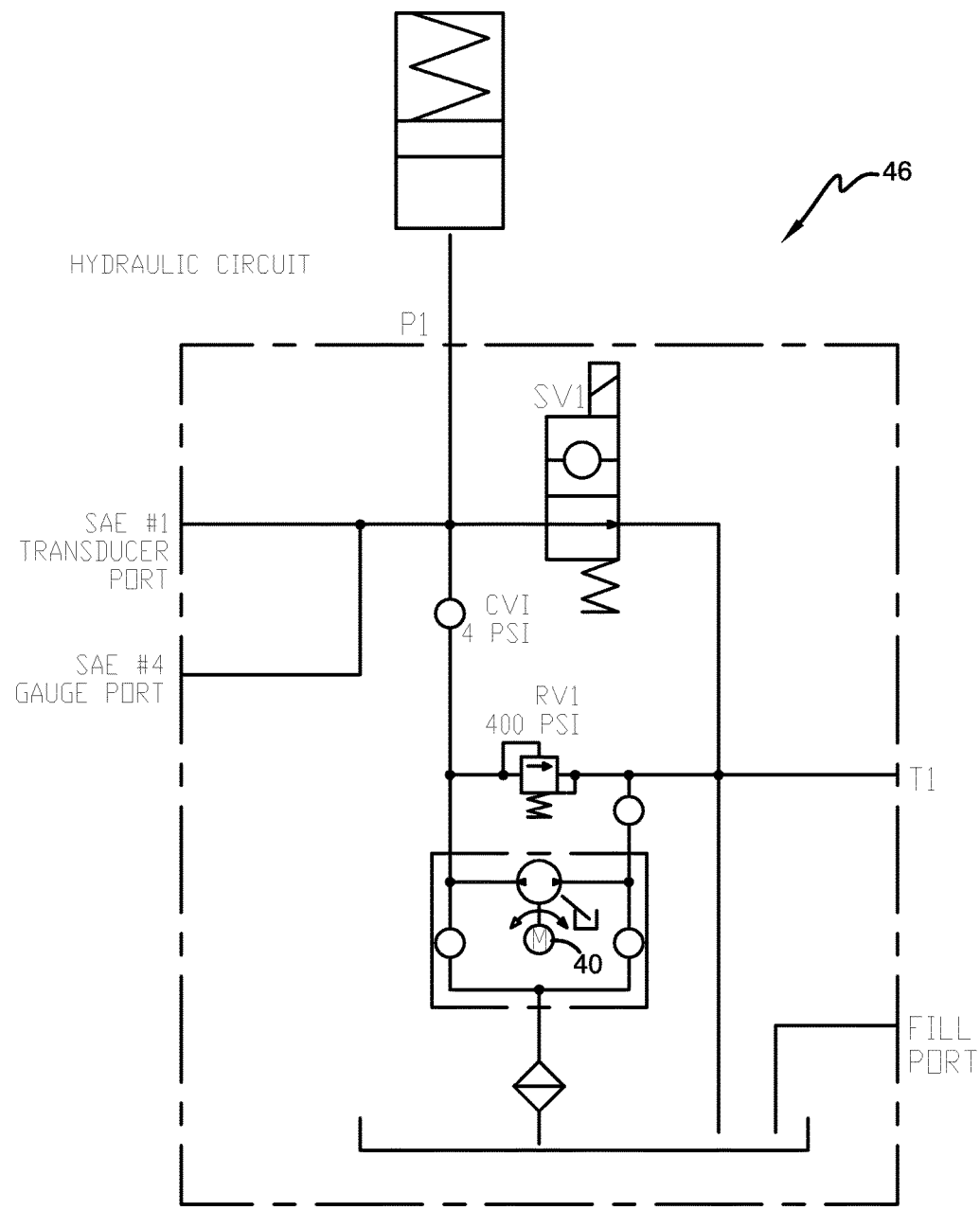
FIG. 7 is the basic hydraulic control circuit of the invention.

An aspect of the present invention is the retrofitting of the invention to existing equipment and minimizing the installation effort. Part of this is achieved by attaching an electric-over-hydraulic actuator and its electronic controls directly to the clutch housing, achieving a tight package of the elements necessary to control the pressure to the clutch piston. As shown in FIG. 5, the clutch housing 38, in the form of a bellhousing adapted for connection to the diesel engine, receives a DC motor 40 in operative connection with a hydraulic pump assembly 42, having a self-contained reservoir and manifold. Diametrically opposed and interconnected to the bellhousing 38 is a controller 44 for regulating the motor 40. The basic control circuit contemplated as a part of the invention is designated by the numeral 46 and shown in FIG. 7. Pressure control is achieved by pulse-width modulation of the DC motor 40 that is coupled to the hydraulic pump 42. It will be appreciated that pressure could also be controlled by simply switching the motor 40 on and off in a conventional manner with a pulse-width-modulated valve being interposed between the pump and the clutch piston, the valve being controlled by the controller 44.

Figure 6:
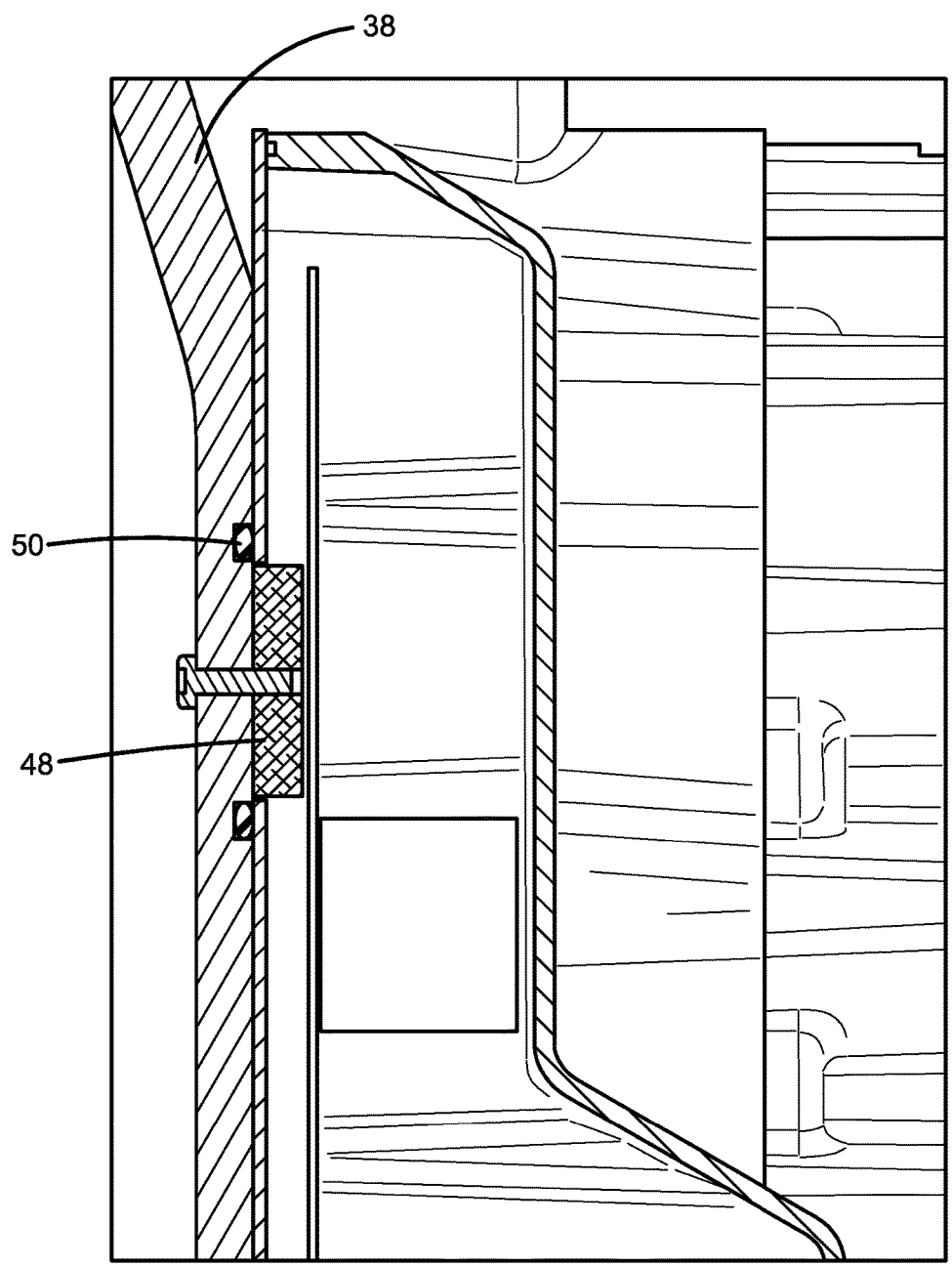
FIG. 6 is an illustrative view of the invention showing the positioning and maintenance of an RFID tag or chip.

The invention further contemplates that the clutch itself may have a radiofrequency identification (RFID) tag or chip attached to the housing in close proximity to the actuator controller 44 such that the controller can identify various clutch parameters and regulate its operation accordingly. As shown in FIG. 6, an RFID tag or chip 48 may be positioned in association with the housing 38 and isolated by means of a sealing ring or washer 50. With this communication between the RFID tag 48 and the controller 44, ideal operating principles can be employed to adapt to the specific clutch size and application involved. Moreover, clutch information such as serial number, date of manufacture, rebuilding history, performance history and the like can be accessed remotely by means of a computer network to eliminate the need to disassemble parts of the machine or clutch for inspection.

Figure 8:
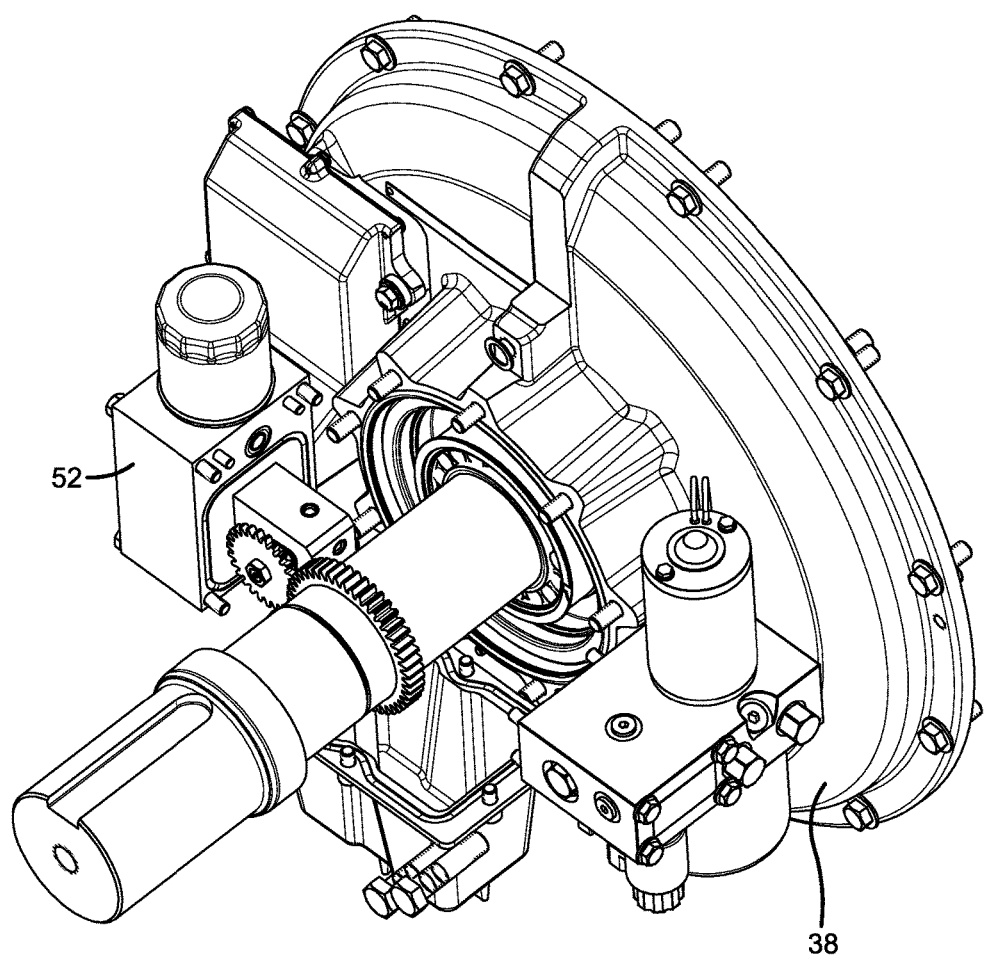
FIG. 8 shows the lubrication system of the invention.
Figure 9:
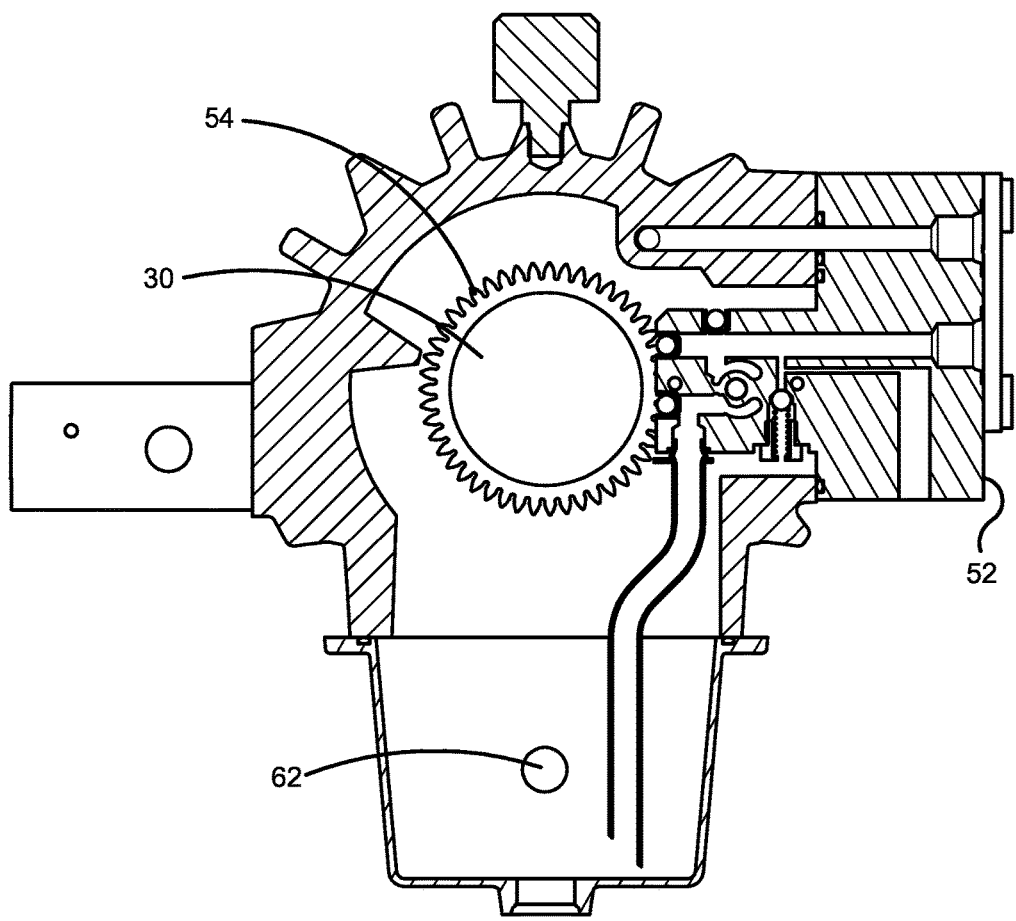
FIG. 9 is a sectional view of the lubrication system of FIG. 8.

In accordance with another aspect of the invention, consideration is given to the means for controlling the heat generated by the clutch shaft support bearings. A first approach to the dissipation of such heat is shown in FIGS. 8 and 9 wherein a parallel-shaft, gear-driven pump is coupled directly to the clutch shaft. This lubrication pump 52 draws oil from an onboard sump 62 and supplies pressurized oil directly to the support bearings. The lubrication circuit allows for an oil cooler to be plumbed into the system to effect the necessary heat transfer to remove the heat. Protection of the bearings from excessive heat can be achieved by monitoring of a heat sensor such as a thermistor placed through the end cover 98 adjacent the shaft 72.

Figure 10:
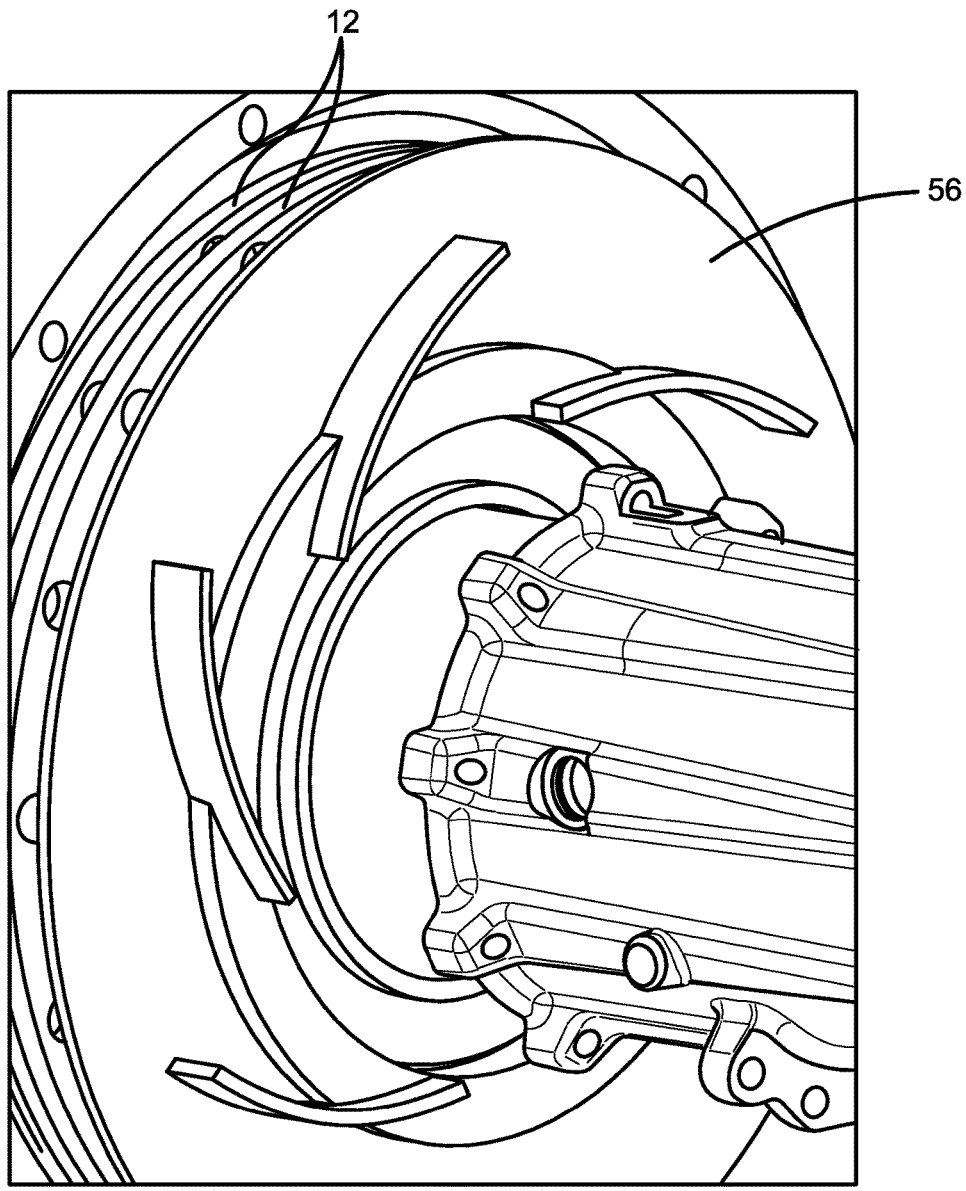
FIG. 10 shows a first embodiment of a centrifugal fan used for cooling the disc pack of the clutch assembly of the invention.
Figure 11:
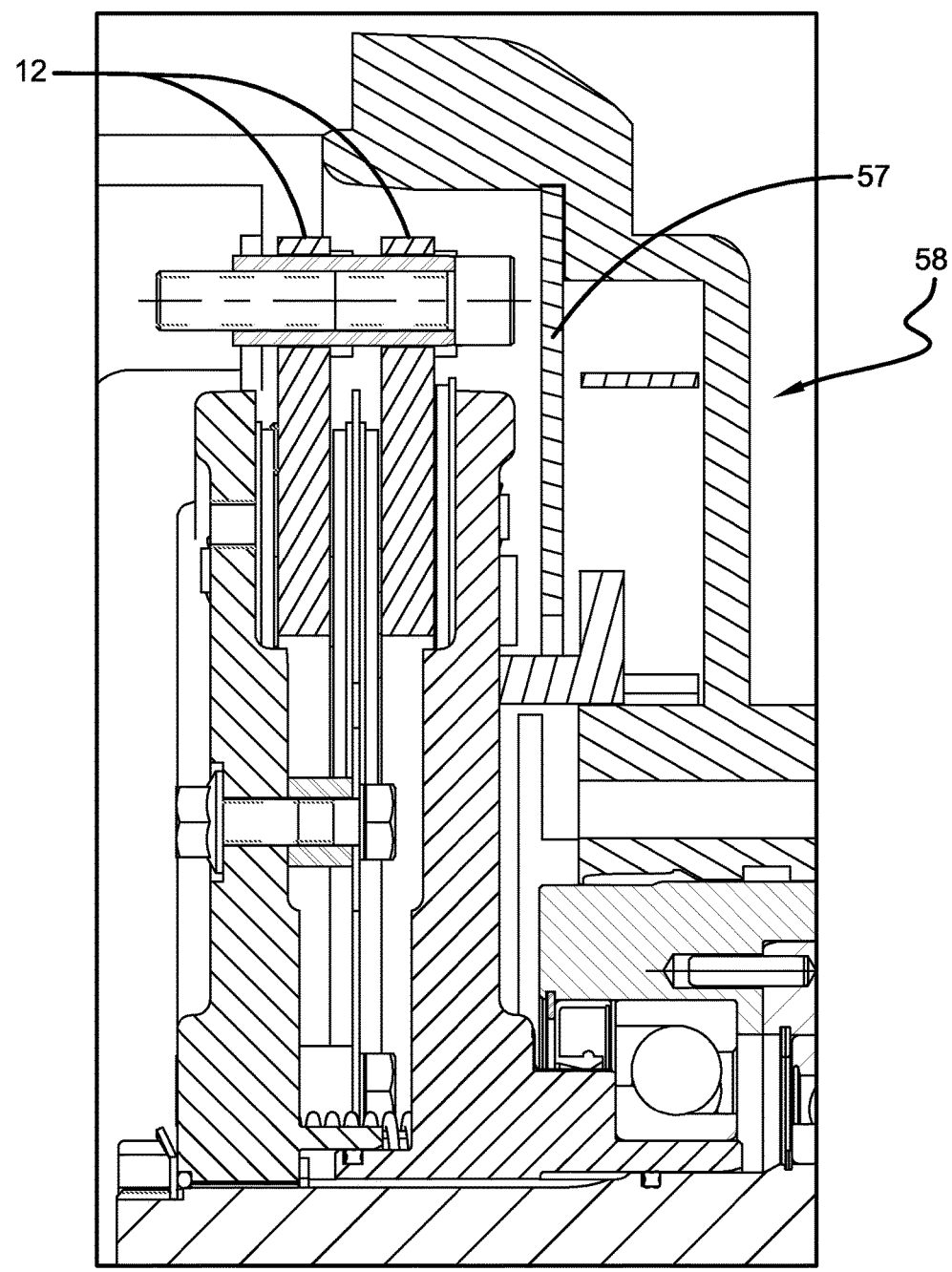
FIG. 11 shows a sectional view of the fan assembly for cooling the disc pack of the clutch assembly of the invention.
Figure 12:
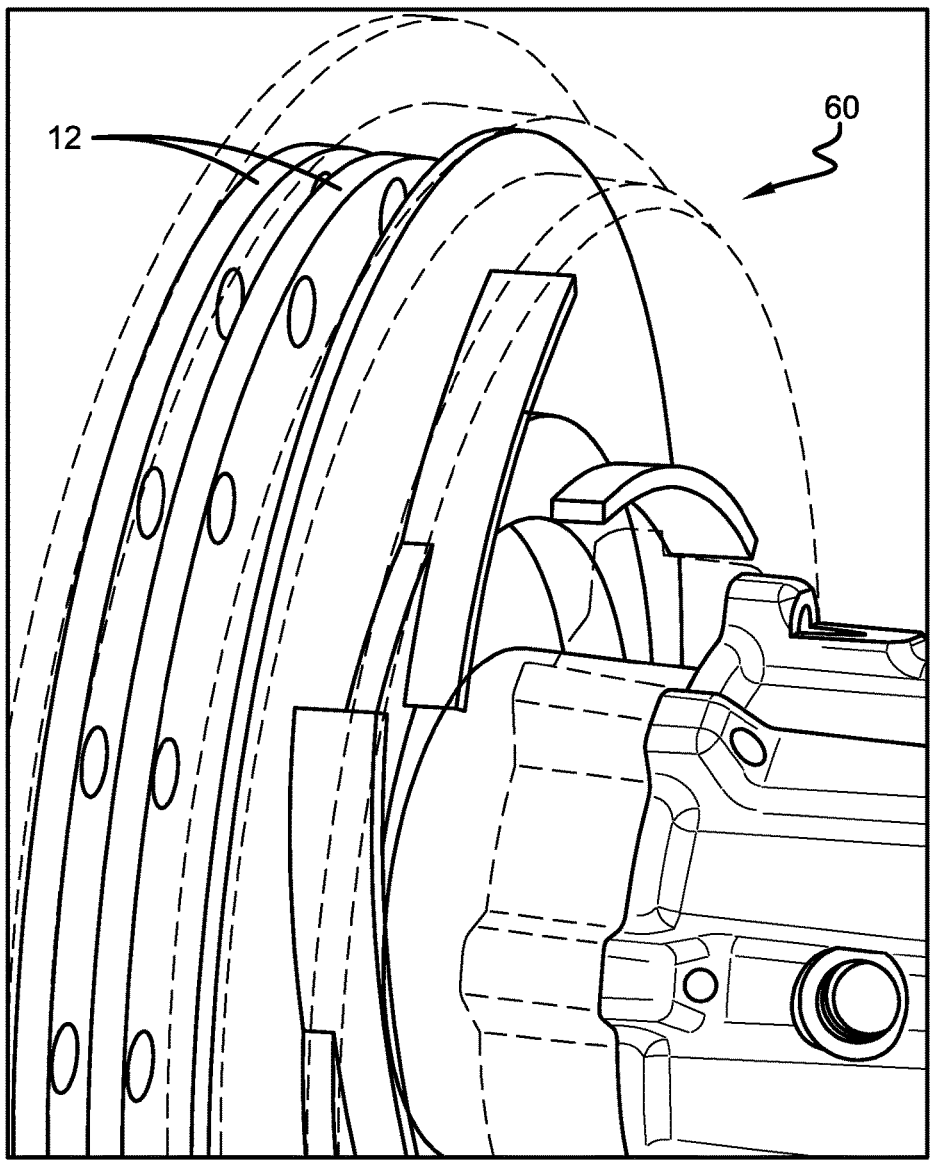
FIG. 12 shows a ducted enclosure for the centrifugal fan for the disc pack of the clutch assembly.

Another approach to heat removal is to use an element in the disc pack maintaining the stator and rotors 16, 12 as a centrifugal fan. As shown in FIGS. 10-12, three such embodiments of centrifugal fan are designated by respective numbers 56, 58, 60. The fans are able to draw cool air from outside the engine enclosure and force convection through the clutch housing. To reduce contamination in the disc pack, the bellhousing is fitted with a flow divider 57 to separate cool outside air from the hot air in the engine-flywheel area.

Figure 13:
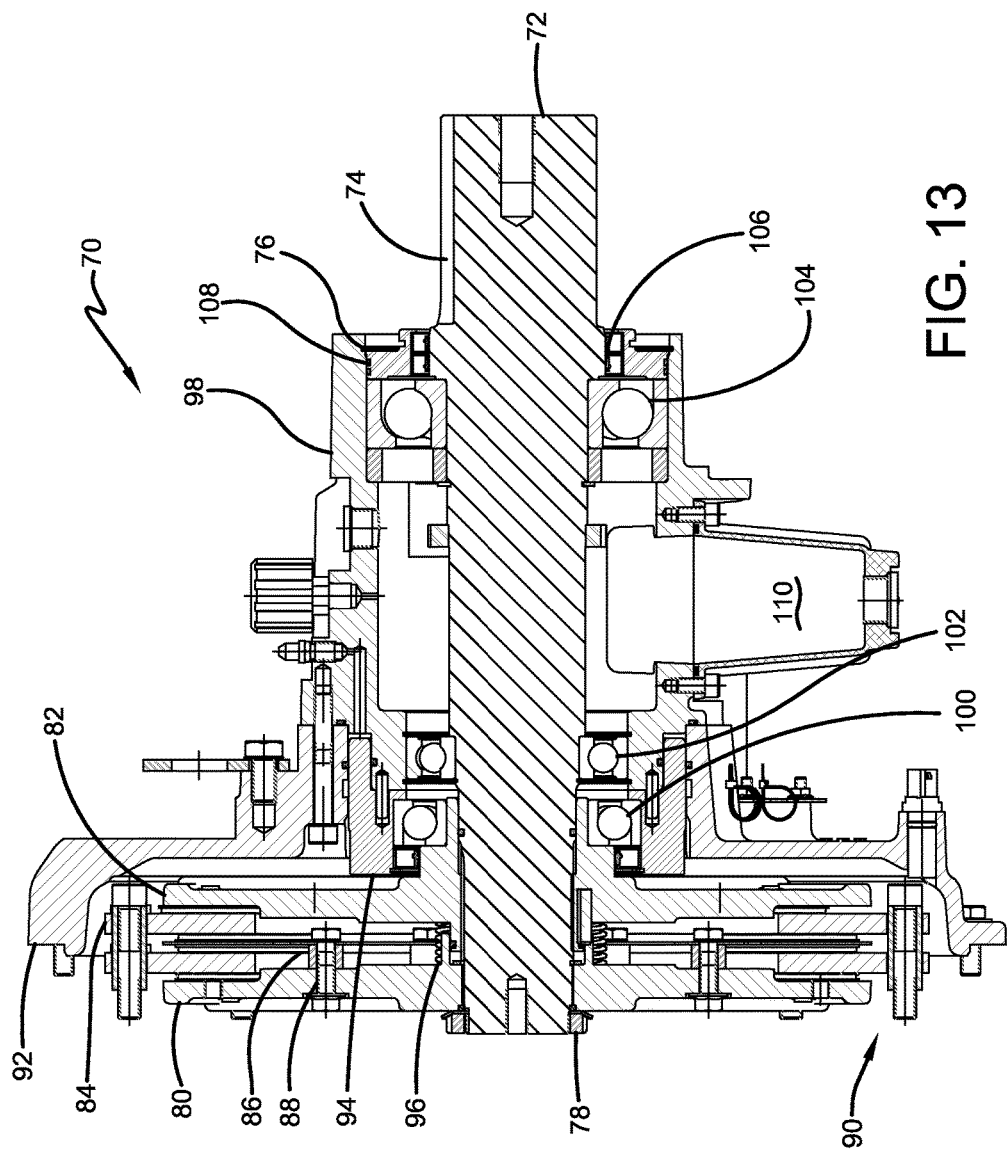
FIG. 13 is a cross-sectional view of a diesel engine clutch assembly according to the invention.
Figure 14:
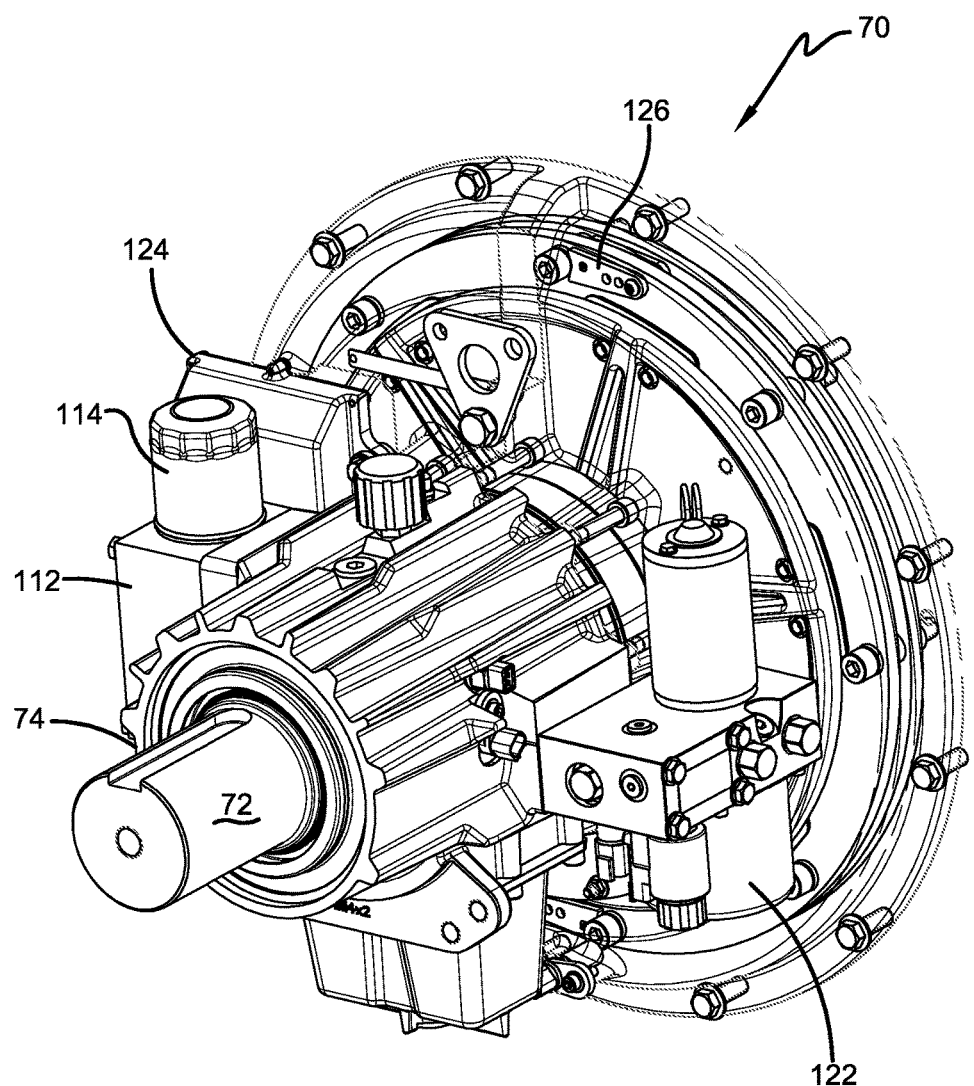
FIG. 14 is a rear perspective view of the clutch of FIG. 13 with certain elements removed for ease of observation.
Figure 15:
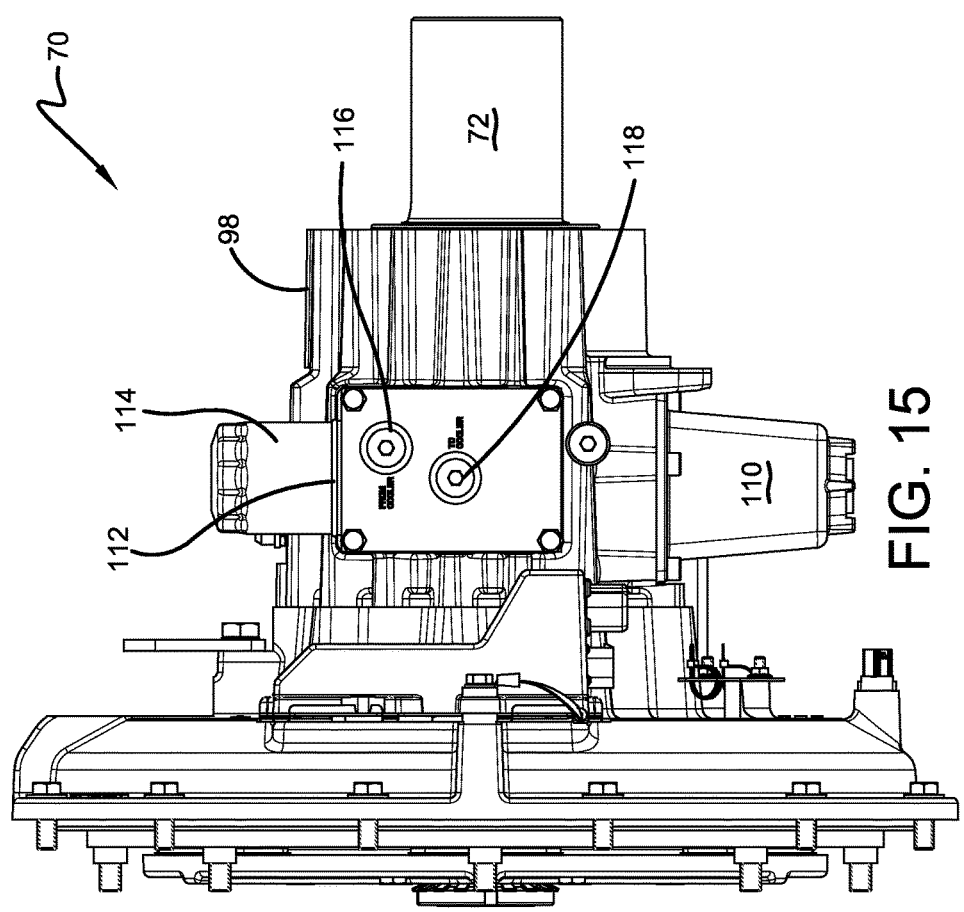
FIG. 15 is a side elevational view of the clutch assembly of FIG. 13.

With reference now to FIGS. 13-15, an appreciation can be obtained as to the overall structure of a diesel engine clutch assembly embodying various features described above, as designated generally by the numeral 70. It will be appreciated that the embodiment shown in FIGS. 13-15 does not use the cooling fans 56, 58, 60, but rather an oil coolant, as will be discussed below. While cooling fans are beneficial and effective in clean environments, it has been found that oil cooling performs better when operating in dusty environments.

The clutch assembly 70 has a clutch shaft 72 that is keyed at 74 to be connected to the input shaft of an implement to be driven. A retaining ring 76 is provided on one end of the shaft 72 and a lock nut 78 at the other to maintain the clutch structure therebetween.

An endplate 80 and a pressure plate 82 are keyed to the shaft 72, sandwiching separator rotors 84 therebetween. A flex plate stator 86 is interposed between the separator rotors 84 and is secured to the endplate 80 by means of cap screw and spacer assemblies 88. Drive pin and cap screw assemblies 90 are positioned circumferentially about the separator rotors 84 for purposes of being secured to the SAE bolt pattern of the associated diesel engine flywheel. A bell housing 92 is provided to encase the operative mechanism of the clutch assembly 70 and to mount the same to the diesel engine.

Hydraulic annular piston 94 is in operative engagement with the pressure plate 82 for engaging the separator rotors 84 with the flex plate stator 86. A return spring 96 is interposed between the endplate 80 and pressure plate 82 to accommodate disengagement of the clutch and the engagement between the rotors 84 and stator 86 upon the release of hydraulic pressure.

An end cover 98 is fixed to the bell housing 92 to complete the housing for the clutch assembly 70 and to provide the necessary support and bearing surfaces for the clutch. As shown, an angular contact bearing 100 is interposed between the pressure plate 82 and bell housing 92. The shaft 72 is supported midway by spaced-apart, cylindrical roller bearing 102 and spherical bearing 104. Adjacent the spherical bearing 104 is a shaft seal 106 having a seal cover 108 interposed between the end cover 98 and shaft seal 106.

While much of the structure presented above with regard to FIGS. 1-12 is embodied in the detailed structure of FIGS. 13-15, it will be appreciated that cooling fans 56, 58, 60 have been replaced with oil cooling, comprising an oil pan 110, oil pump 112, and oil filter 114. An inlet 116 and outlet 118 communicate with the oil pump 112 and direct the oil to and from an oil cooler such as a finned heat sink or the like.

As best shown in FIG. 14, the DC motor 120, hydraulic pump assembly with self-contained reservoir 122, and associated controller 124 are mounted to and contained as a part of the clutch assembly 70. The controller 124 may include a radiofrequency identification (RFID) tag or chip such that the controller can identify various clutch parameters and regulate its operation accordingly, as discussed above.

Also shown in FIG. 14 are centrifugal links 126 like the pivotal weights 32 discussed above with regard to FIG. 2.

As can be seen from the foregoing, the present invention provides the benefit of drive pins 90 interconnecting the clutch to the diesel engine flywheel for the standard SAE bolt pattern. The endplate 80, pressure plate 82, separator rotors 84 and flex plate stator 86 are splined to the shaft 72 with sealed grease splines, the same being sealed at opposite ends thereof. The flex plate stator 86 may alternatively be replaced with leaf springs, both having bonded and/or riveted friction material.

While the invention contemplates the implementation of centrifugal arms or links 32 for purposes of vibration damping, friction washers or over-molded bushing are also contemplated for that purpose. Additionally, while a stationary piston is contemplated in the preferred embodiment for effecting engagement between the rotors 84 and stator 86, the invention also contemplate the utilization of hook rings or any combination of spring-applied or spring-released actuation, coupled with hydraulic or electrical release or application, as the case might be.

The invention also contemplates that an RFID tag or chip 48 may be positioned in association with the clutch housing for ease of recording and accessing information specific to the clutch, such as hours of operation, frequency of engagements, code versions, and the like. Moreover, the serial number, date of manufacture, place of manufacture, status of rebuild, and the like may be made available.

Specifically beneficial with the implementation of the instant invention is the fact that the clutch assembly 70 is a unitary package, including all of the necessary hydraulics, pulse width modulating motor, and oil cooling in a single, unique package. The prior art is devoid of a single replacement unit packaged together and readily adapted for interconnection with a diesel engine flywheel and readily adapted for operative engagement with any of various implements. There is no hydraulic pump, reservoir or filtration system required separate and apart from the unit itself. By being a single unit, there is no complex wiring harness and maintenance is minimized because of the self-contained, sealed oil system. There is no need for a pulse width modulation valve, since a PWM motor is employed and operates "on demand." By providing an integrated lube oil pump system 110-118, the clutch assembly 70 is provided with a means for removing heat from the clutch bearings and high ambient temperature conditions while simplifying installation. The oil pump may be of any of various types, including a parallel shaft (as shown) or a perpendicular shaft, and may include an integrated relief valve and filter head. The pump may be gear, belt, chain, friction, or magnetically driven.

The disc pack comprising separator rotors 84 and flex plate stator 86 may be provided with an integrated fan for cooling purposes to remove heat from the disc pack and surrounding supporting structure without the need for additional components. The fan blades may be directly attached or integrated into the outermost disc pack member and can be of any of various natures, including ducted or non-ducted, centrifugal, straight, or straight-bladed.

It is additionally contemplated that the controller 124 will include a real-time clock for time-stamping various events and for providing the means to monitor system operation.

Thus it can be seen that the various aspects of the invention have been attained by the structure presented above. While in accordance with the patent statutes, only the best known and preferred embodiments of the invention have been presented and described in detail, the invention is not limited thereto or thereby. Accordingly, for an appreciation of the true scope and breadth of the invention, reference should be made to the following claims.

What is claimed is:

1. A self-contained diesel engine clutch assembly, comprising:
 a shaft;
 an endplate and a pressure plate received on an end of said shaft and rotatable therewith;
 a stator;
 first and second rotors between said endplate and pressure plate and sandwiching said stator;
 drive pins for engagement with a flywheel;
 an electric motor in operative connection with a hydraulic pump assembly;
 a controller regulating said motor with pulse width modulation;
 a radiofrequency identification tag in proximity to said controller, said controller regulating operation of the clutch assembly as a function of said radiofrequency identification tag; and
 a housing retaining said shaft, endplate, pressure plate, stator and rotors, and further comprising an oil pump in association with an oil pan, said oil pump providing lubricant to shaft support bearings.

2. The self-contained diesel engine clutch assembly according to claim 1, wherein said hydraulic pump assembly has a self-contained reservoir and manifold.

3. The self-contained diesel engine clutch assembly according to claim 1, wherein said oil pump, oil pan, and an oil filter are connected to said housing.

4. The self-contained diesel engine clutch assembly according to claim 3, wherein said oil pump has an output and input for passing oil to and from an oil cooler.

5. The self-contained diesel engine clutch assembly according to claim 1, wherein said oil pump is driven by means taken from the group of gears, belts, chains, friction, or magnetic drive.

6. The self-contained diesel engine clutch assembly according to claim 1, further comprising a temperature sensor in association with said shaft support bearings.

7. A self-contained diesel engine clutch assembly, comprising:
a shaft;
an endplate and a pressure plate received on an end of said shaft and rotatable therewith;
a stator connected to said endplate;
first and second rotors between said endplate and pressure plate and sandwiching said stator, said rotors having means for damping vibration;
drive pins for interconnecting said first and second rotors to a flywheel;
a housing maintaining said shaft, endplate, pressure plate, stator and rotors, and an oil pump lubricating support bearings of said shaft; and
an electric motor connected to a hydraulic pump assembly, said electric motor being controlled by pulse width modulation to regulate an application of hydraulic pressure to said pressure plate.

8. The self-contained diesel engine clutch assembly according to claim 7, wherein said friction stator has cooling fan blades connected thereto.

9. The self-contained diesel engine clutch assembly according to claim 8, wherein said means for damping vibration are taken from the group comprising centrifugal counterweights, friction washers, and elastomeric polymer-coated bushings.

10. The self-contained diesel engine clutch assembly according to claim 9, further comprising an oil pan and oil filter connected to said housing in association with said oil pump.

11. The self-contained diesel engine clutch assembly according to claim 10, wherein said oil pump is driven by means taken from the group of gears, belts, chains, friction, or magnetic drive.

12. A self-contained diesel engine clutch assembly, comprising:
a shaft;
an endplate and a pressure plate received on an end of said shaft and rotatable therewith;
a stator;
first and second rotors between said endplate and pressure plate and sandwiching said stator;
drive pins for interconnecting said first and second rotors to a flywheel
an electric motor in operative connection with a hydraulic pump assembly; and
a housing retaining said shaft, endplate, pressure plate, stator and rotors, and further comprising an oil pump in association with an oil pan, said oil pump providing lubricant to shaft support bearings.

13. The self-contained diesel engine clutch assembly according to claim 12, further comprising a controller regulating said motor with pulse width modulation.

14. The self-contained diesel engine clutch assembly according to claim 13, further comprising a radiofrequency identification tag in proximity to said controller, said controller regulating operation of the clutch assembly as a function of said radiofrequency identification tag.

15. The self-contained diesel engine clutch assembly according to claim 12, wherein said oil pump, oil pan, and an oil filter are connected to said housing.

16. The self-contained diesel engine clutch assembly according to claim 15, wherein said oil pump has an output and input for passing oil to and from an oil cooler.

17. The self-contained diesel engine clutch assembly according to claim 12, wherein said oil pump is driven by means taken from the group of gears, belts, chains, friction, or magnetic drive.

18. The self-contained diesel engine clutch assembly according to claim 12, further comprising a temperature sensor in association with said shaft support bearings.

19. The self-contained diesel engine clutch assembly according to claim 12, wherein said hydraulic pump assembly has a self-contained reservoir and manifold.

* * * * *